United States Patent
Chang et al.

(10) Patent No.: US 8,018,997 B2
(45) Date of Patent: Sep. 13, 2011

(54) SYSTEM AND METHOD FOR VIDEO ENCODING

(75) Inventors: Han-Jen Chang, Taipei (TW); Wei-Min Chao, Chungli (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1678 days.

(21) Appl. No.: 11/298,412

(22) Filed: Dec. 8, 2005

(65) Prior Publication Data

US 2006/0133480 A1    Jun. 22, 2006

(30) Foreign Application Priority Data

Dec. 17, 2004    (TW) .............................. 93139252 A

(51) Int. Cl.
  *H04N 7/12*    (2006.01)
(52) U.S. Cl. ......... 375/240.03; 375/240.02; 375/240.04; 375/240.05; 375/240.06
(58) Field of Classification Search . 375/240.02–240.06
See application file for complete search history.

(56) References Cited

U.S. PATENT DOCUMENTS

| 6,351,493 | B1 | 2/2002 | Reed et al. |
| 6,654,417 | B1 | 11/2003 | Hui |
| 7,023,917 | B2 * | 4/2006 | Nesvadba et al. ........ 375/240.03 |

* cited by examiner

*Primary Examiner* — Jay Au Patel
*Assistant Examiner* — Geepy Pe
(74) *Attorney, Agent, or Firm* — Thomas|Kayden

(57) ABSTRACT

A video encoding method and system are provided for encoding a video sequence. The video sequence includes N sub-sequences which each includes a plurality of frames. When the video encoding system encodes the jth frame in the ith sub-sequence of the video sequence, the frames previous to the jth frame in the ith sub-sequence have been encoded. Based on the encoded frames, an initial quantization scale is generated. According to the initial quantization scale, the jth frame of the ith sub-sequence is encoded in the inter-encoded mode. Whether the jth frame in the ith sub-sequence is a "scene change" relative to the (j−1)th frame in the ith subsequence is judged, and if YES, based on the initial quantization scale, an adjusted quantization scale is generated. Moreover, the jth frame in the ith sub-sequence is re-encoded in accordance with the adjusted quantization scale.

14 Claims, 4 Drawing Sheets

SYSTEM AND METHOD FOR VIDEO ENCODING

BACKGROUND OF THE INVENTION

1. Field of the Invention

This present invention relates to a video encoding system and method featuring an adaptive one-pass variable bit rate controller with scene change detection.

2. Description of the Prior Art

In recent years, technology on digital compression has been widely applied to compress files of various video formats to save the transmission bandwidth or storage capacity. Generally speaking, the most widely adopted techniques are the MPEG (Motion Picture Experts Group) standards established by the ISO (International organization for standardization), such as MPEG-1, MPEG-2, MPEG-4, etc.

It is well known that a MPEG compliant video encoder compresses an input video sequence to achieve a target bit rate defined by the bandwidth of a user-desired video channel before it is transmitted or saved in a storage device. However, when the compressed video sequence associated with a scene, encoded with a constant bit rate, is decoded, the quality of the decoded video sequence will significantly depend on the complexity of the scene.

In practical application, the video sequence is compressed with a variable bit rate. The so-called variable bit rate technique improves the quality of video encoding by adaptively allocating bit rates according to the complexity of the scene. Basically, the rate control for video encoding can be categorized into two fields: one is multi-pass variable bit rate; and the other is single pass variable bit rate. The multi-pass variable bit rate technology utilizes the complexity information of the scene through preceding passes to achieve the target bit rate constraint. The single pass variable bit rate technology adjusts encoding rate dynamically through encoding process. The multi-pass variable bit rate algorithm for video encoding usually provides better picture quality; however, it also requires a larger amount of memory and more expensive computational cost. Therefore, such kind of variable bit rate technique is not suitable for real-time applications. On the other hand, the single pass variable bit rate algorithm cannot guarantee a consistent quality for the entire sequence, especially those sequences with abrupt scene changes.

The main objective of this invention is to provide a video encoding system and method using an adaptive one-pass variable bit rate controller with scene change detection to resolve the problems mentioned above.

SUMMARY OF THE INVENTION

Accordingly, one objective of this invention is to provide a video encoding system and method using an adaptive one-pass variable bit rate controller with scene change detection. The system and method according to the invention is used to detect whether one frame in a video sequence is a scene change, and if YES, to re-encode the frame according to complexity information so as to achieve a consistent quality throughout the entire sequence.

The video encoding method of this invention is to encode a video sequence consisting of N subsequences where N is a natural number and each subsequence includes a plurality of frames. More specifically, the video encoding method of this invention is to encode the jth frame in the ith subsequence, provided that all frames previous to the jth frame in the ith subsequence have been encoded. In the above definition, i is an integer index ranging from 1 to N, and j is an integer index ranging from 2 to the number of frames in the ith subsequence.

The video encoding method of this invention includes the following steps. First, the method is performed to generate an initial quantization scale based on the encoded frames, and to encode the jth frame in the ith subsequence in accordance with the initial quantization scale in a first encoding mode. Next, the method is performed to determine whether the jth frame in the ith subsequence is a scene change relative to the (j−1)th frame in the ith subsequence. If YES in above step, the method is performed to generate an adjusted quantization scale based on the initial quantization scale, and to re-encode the jth frame in the ith subsequence in a second encoding mode in accordance with the adjusted quantization scale.

In this invention, when the current frame in a video sequence is labeled as a scene change, the video encoder re-encodes the current frame according to the complexity information of encoded frames. Specifically, this invention only re-encodes those frames where a scene change is detected. Therefore, this invention is a hybrid technique of multi-pass and single pass variable bit rate controller, which achieves better and consistent picture quality of the encoded video sequences. Besides, it can save a large amount of temporary encoding data.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
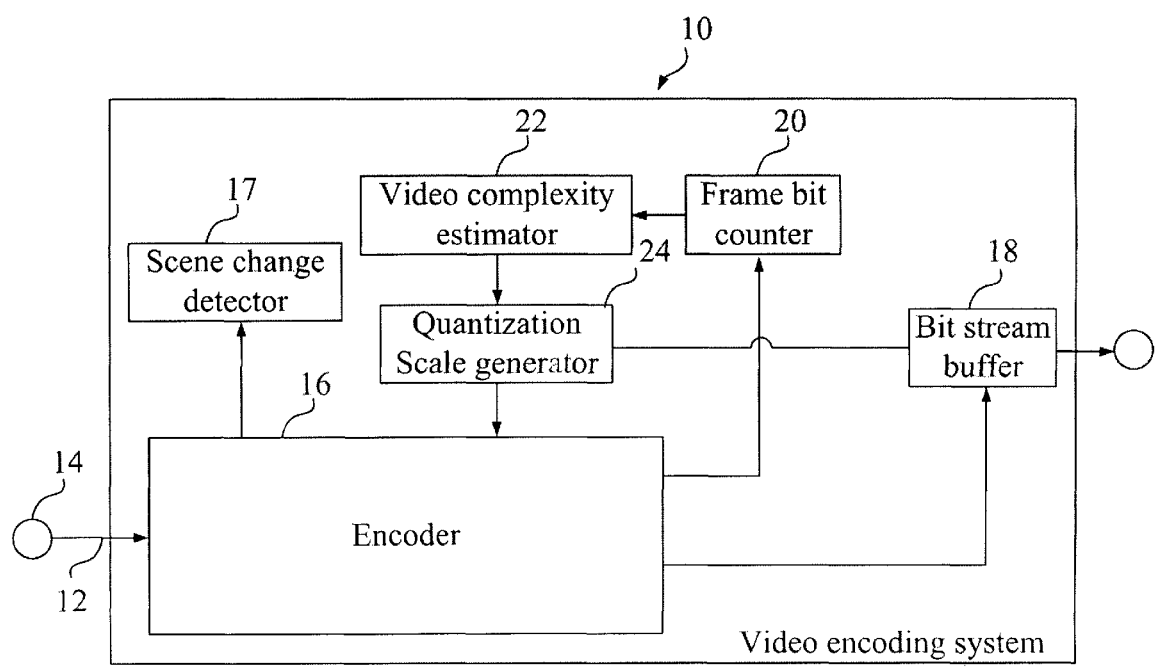
FIG. 1A is the function-block diagram of the video encoding system of the invention.

Referring to FIG. 1A, the function-block diagram of the video encoding system 10 of the invention is illustrated. As shown in FIG. 1A, a video sequence 12 includes N subsequences and N is a natural number. Each subsequence includes a plurality of frames. Each frame in the video sequence 12 has a predefined number of rows and columns and each row and column has a plurality of macroblocks (MBs). The video sequence 12 is inputted into the video encoding system 10 from an input end 14. The video encoding system 10 is used to encode the jth frame in the ith subsequence, provided that all frames previous to the jth frame in the ith subsequence have been encoded. In the above definition, i is an integer index ranging from 1 to N, and j is an integer index ranging from 2 to the number of frames in the ith subsequence.

As shown in FIG. 1A, the video encoding system 10 of the invention includes an encoder 16, a scene change detector 17, a bit stream buffer 18, a frame bit counter 20, a video complexity estimator 22 and a quantization scale generator 24. The encoder 16 is coupled to the input end 14 and used to receive and encode the video sequence 12. Before the encoder 16 processes the current frame, an encoding mode is chosen to encode the macroblocks in the current frame. Encoding modes can be generally categorized into two types: Intra-encoding mode and Inter-encoding mode. Frames encoded by the intra-encoding mode are called intra frames (or I frames), and frames encoded by the inter-encoding mode are called inter frames (P frames or B frames). I frames are encoded without referencing any other frames whereas P frames are obtained by referencing the previous frame and B frames by referencing both the previous and next frame.

The scene change detector 17 is coupled to the encoder 16 and used to determine if the jth frame in the ith subsequence is a scene change relative to the (j−1)th frame in the ith subsequence. The quantization scale generator 24 is coupled to the encoder 16 and used to generate an initial quantization scale based on the encoded frames. If the jth frame in the ith subsequence is a scene change, the quantization scale generator 24 generates an adjusted quantization scale based on the initial quantization scale and the encoder 16 re-encodes the jth frame in the ith subsequence in a second encoding mode in accordance with the adjusted quantization scale. The second encoding mode is the aforementioned intra-encoding mode. Otherwise, if the jth frame in the ith subsequence is not a scene change, the encoder 16 encodes the jth frame in the ith subsequence in a first encoding mode in accordance with the initial quantization scale. The first encoding mode is the aforementioned inter-encoding mode.

In an embodiment, the video sequence 12 includes three subsequences and each subsequence includes one hundred frames. The video encoding system 10 is currently encoding the 33th frame in the second subsequence and all previous frames have been encoded, that is, all frames of subsequence one and frame 1 to frame 32 in subsequence two have been encoded. It is noted that the intra-encoding mode is used to encode the first frame in each subsequence. The quantization scale generator 24 generates an initial quantization scale based on the encoded frames. The scene change detector 17 determines if the 33th frame in the second subsequence is a scene change relative to the 32th frame in the second subsequence. If the 33th frame in the second subsequence is not a scene change, the encoder 16 encodes the 33th frame in the second subsequence in inter-encoding mode in accordance with the initial quantization scale. If the 33th frame in the second subsequence is a scene change, the quantization scale generator 24 generates an adjusted quantization scale based on the initial quantization scale and the encoder 16 re-encodes the 33th frame in the second subsequence in intra-encoding mode in accordance with the adjusted quantization scale. Specifically, this invention only re-encodes those frames where a scene change is detected.

The bit stream buffer 18 is coupled to the encoder 16 and used to save the encoded bit streams of a frame temporarily. The frame bit counter 20 is coupled to the encoder 16 and used to keep the accumulated bit length of each encoded frames in the video sequence 12 and generate an accumulated bit stream. The video complexity estimator 22 is disposed between the frame bit counter 20 and the quantization scale generator 24 and used to receive the accumulated bit stream generated by the frame bit counter and generate a first and second video complexity.

The first video complexity is determined by the following equation:

$$X_A = S_A * Q_A * \frac{F}{N_A^2}, \qquad (1)$$

where $S_A$ is a first summation of bit length defining the accumulated bit length of all frames previous to the jth frame of the ith subsequence, $Q_A$ is a first summation of quantization scale defined by accumulating the quantization scales of all frames previous to the jth frame of the ith subsequence, $N_A$ is a first number of frames defining the number of all frames previous to the jth frame of the ith subsequence, and F is a predetermined frame rate.

In the above embodiment, $S_A$, $Q_A$ and $N_A$ correspond to the summation of bit length, summation of quantization scale and number of all frames previous to the 33th frame of the second subsequence, respectively. The frame rate F is the number of static frames displayed per second.

The second video complexity is determined by the following equation:

$$X_L = S_L * Q_L * \frac{F}{N_L^2}, \qquad (2)$$

where $S_L$ is a second summation of bit length defining the accumulated bit length of frames between the first and the (j−1)th frame in the ith subsequence, $Q_L$ is a second summation of quantization scale defined by accumulating the quantization scales of frames between the first and the (j−1)th frame in the ith subsequence, $N_L$ is a second number of frames defining the number of frames between the first and the (j−1)th frame in the ith subsequence.

In the above embodiment, $S_L$, $Q_L$ and $N_L$ correspond to the summation of bit length, summation of quantization scale and number of frames between the first and the 32th frame in the second subsequence, respectively.

The initial quantization scale is determined by a predicted quantization scale and a differential quantization scale. The predicted quantization scale $Q_P$ is determined by the following equation:

$$Q_P = \frac{\mathrm{MIN}(X_A, X_L)}{B} + 1, \qquad (3)$$

where $X_A$ is the first video complexity defining the video complexity of all frames previous to the jth frame of the ith subsequence, and $X_L$ is the second video complexity defining the video complexity of frames between the first and the (j−1)th frame in the ith subsequence. B is a predetermined target bit rate.

In the above embodiment, $X_A$ is the video complexity of all frames previous to the 33th frame in the second subsequence, and $X_L$ is the video complexity of frames between the first and the 32th frame in the second subsequence.

The differential quantization scale $Q_d$ is determined by the following equation:

$$Q_d = K * \left( \frac{S_{buf}}{\mathrm{buf\_size}} - 0.5 \right), S_{buf} = \mathrm{MAX}\left( S_{buf} + S_j - \frac{B}{F}, 0 \right) \qquad (4)$$

where $S_{buf}$ is the current number of buffered bits by the bit stream buffer 18, $S_j$ is the current number of generated bits from the jth frame in the jth subsequence, buf_size is a predetermined buffer size, and K is a first predefined model parameter which determines the scale of differential quantization scale.

Therefore, the initial quantization scale Q is determined by the following equation:

$$Q = \mathrm{MAX}(Q_{MIN}, \mathrm{MIN}(Q_{MAX}, Q_P + Q_d)), \qquad (5)$$

where a predetermined maximum and the minimum value of quantization scale are defined by $Q_{MAX}$ and $Q_{MIN}$, respectively.

Figure 1B:
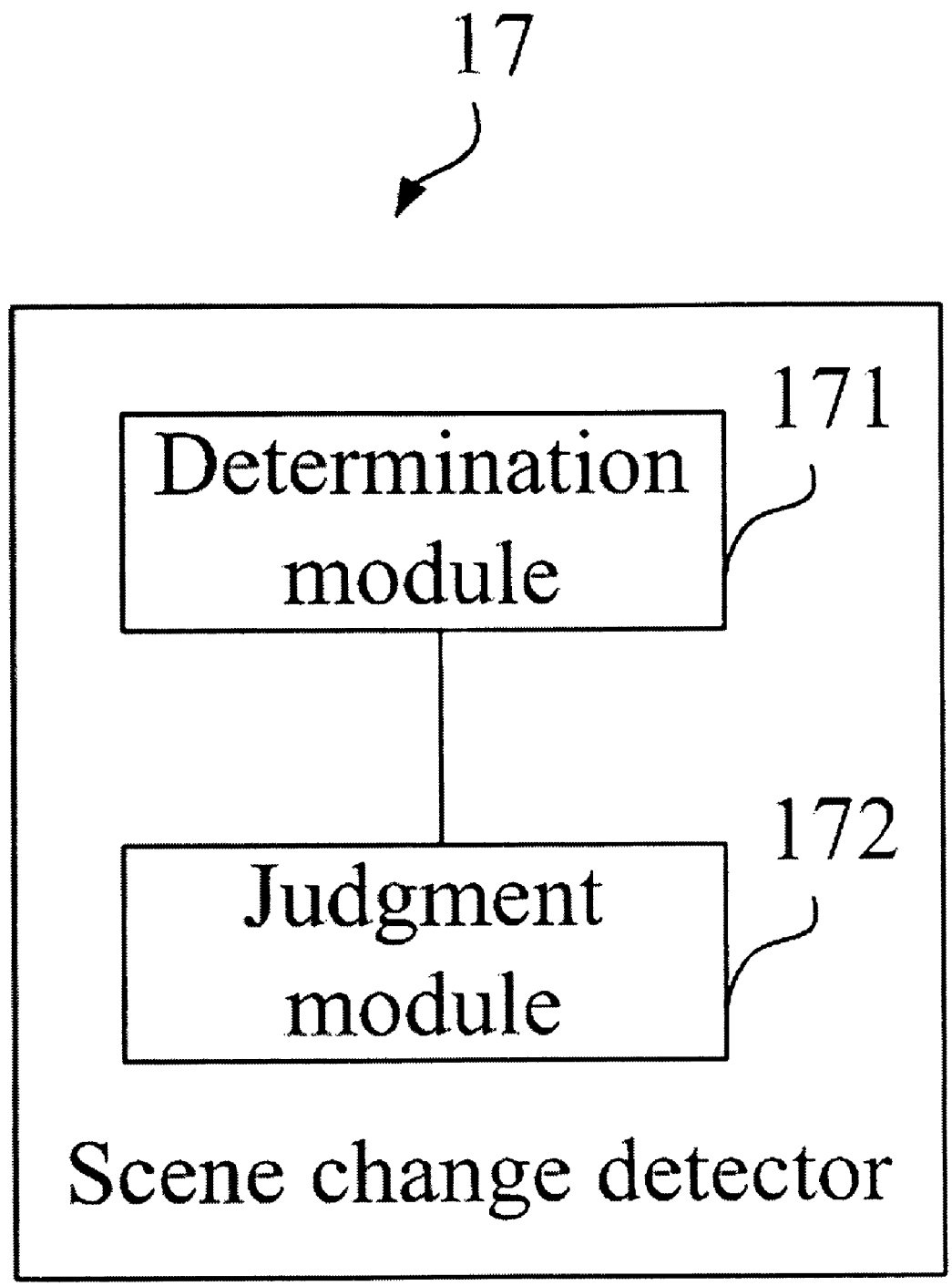
FIG. 1B is the block diagram of the scene change detector shown in FIG. 1A.
Figure 1C:
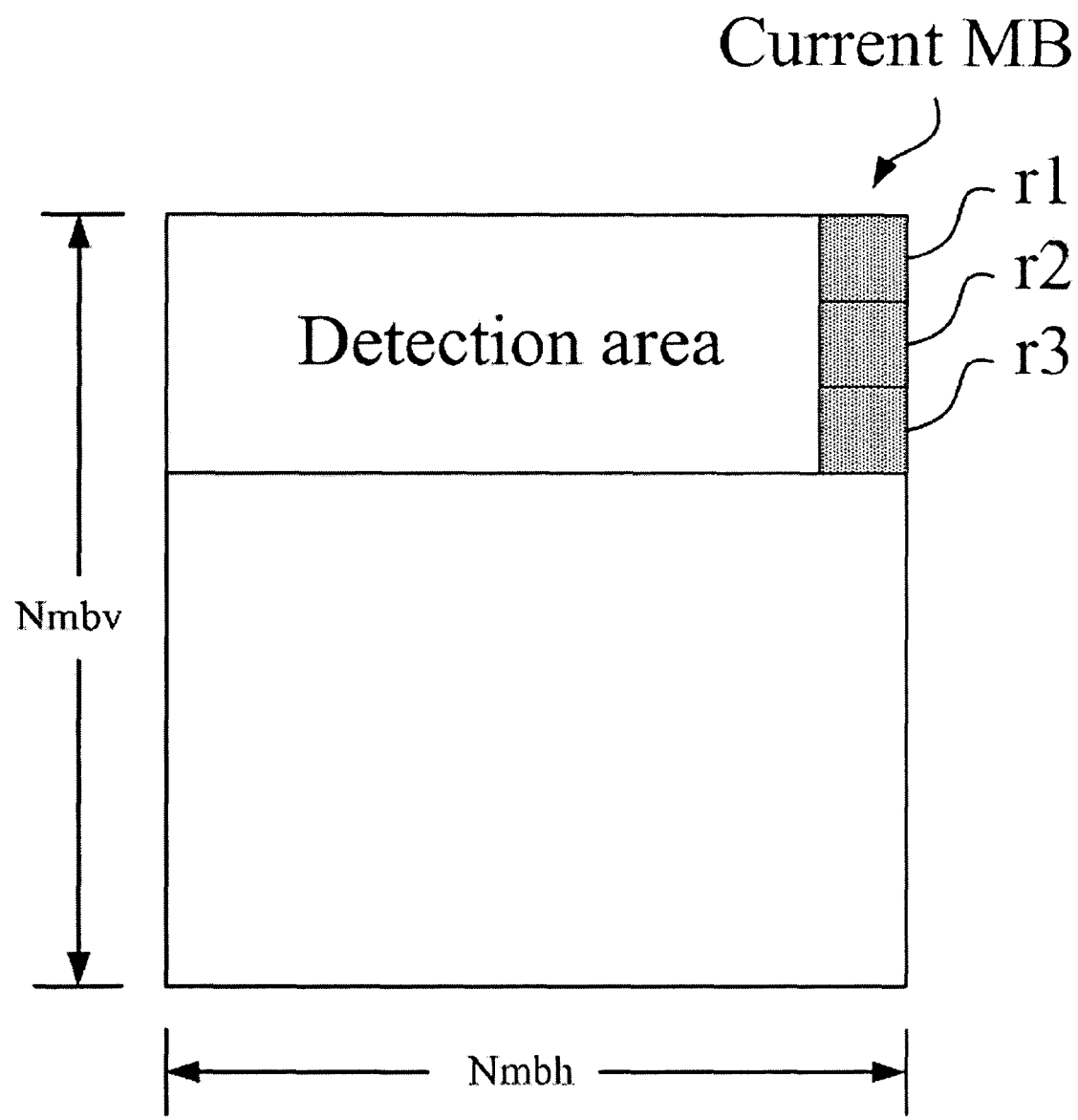
FIG. 1C shows schematically the detection area defined by the determination module shown in FIG. 1B.

Referring to FIGS. 1B and 1C, the block diagram of the scene change detector 17 shown in FIG. 1A is illustrated in FIG. 1B. FIG. 1C shows schematically the detection area defined by the determination module 171 shown in FIG. 1B. The scene change detector 17 includes a determination module 171 and a judgment module 172. The determination module 171 is used to determine a detection area in the current jth frame. The judgment module 172 determines whether the total number of intra macroblocks of all rows previous to and including a current processing row within the detection area is greater than a threshold when the last intra macroblock of the current processing row is being processed. The judgment module 172 labels the current jth frame as a scene change if the total number of intra macroblocks of all rows previous to and including the current processing row within the detection area is greater than the threshold; otherwise, if the total number of intra macroblocks of all rows previous to and including the current processing row within the detection area is not greater than the threshold, the judgment module 172 continues performing the judgment process on the current jth frame until all rows in the detection area are examined. The threshold THR_SC is determined by the following equation:

$$\text{THR\_SC} = \frac{N_{mbv}}{DA} * N_{mbh} * \text{SC\_RATIO} + 1, \quad (6)$$

where $N_{mbv}$ is the number of macroblocks of a single column in the current jth frame, and $N_{mbh}$ is the number of macroblocks of a single row in the current jth frame, DA is a natural number used to define the detection area, and SC_RATIO is a scene change ratio with which a percentage of intra macroblock in the detection area for scene change is determined.

In the above embodiment, let each frame in the video sequence 12 have a predetermined number of rows and columns, e.g. 9 rows and 11 columns. Therefore, each row includes 11 macroblocks and each column includes 9 macroblocks. The value of DA can be adjusted according to the frame rate F. When DA is set to 3 and SC_RATIO is set to 20%, the corresponding threshold is 7.6.

As shown in FIG. 1C, when DA is set to 3, the detection area occupies one-third of the whole frame. In this embodiment, the detection area in the current 33th frame in the second subsequence includes three rows, i.e. r1, r2 and r3. The judgment module 172 determines if the total number of intra macroblocks of r1 is greater than the threshold when the current processing macroblock is the last macroblock of r1 (the dark gray area in FIG. 1C). If YES, the current 33th frame in the second subsequence is labeled as a scene change. Otherwise, the judgment module 172 proceeds with checking the total number of intra macroblocks of r2 and r3. This process is iterated until all rows in the detection are examined. The judgment module continues to perform the same judgment process on the next frame.

When the jth frame in the ith subsequence is labeled as a scene change by the scene change detector 17, the quantization scale generator 24 generates an adjusted quantization scale based on the initial quantization scale and the encoder 16 re-encodes the jth frame in the ith subsequence in intra-encoding mode in accordance with the adjusted quantization scale.

The adjusted quantization scale $\hat{Q}$ is determined by the following equation:

$$\hat{Q} = Q * \left( \frac{S_{intra}}{L} * \frac{N_{mb}}{N_{intra}} * \frac{F}{B} \right), \quad (7)$$

where $N_{mb}$ is the number of total macroblocks in the current jth frame, $N_{intra}$ is the number of intra macroblocks within the detection area in the current jth frame, $S_{intra}$ is the bit length of intra macroblocks within the detection area of the current jth frame, and L is a second predetermined model parameter.

The invention also provides a video encoding method for encoding a video sequence consisting of N subsequences, wherein N is a natural number and each subsequence includes a plurality of frames. More specifically, the video encoding method of this invention is to encode the jth frame in the ith subsequence, provided that all frames previous to the jth frame in the ith subsequence have been encoded. In the above definition, i is an integer index ranging from 1 to N, and j is an integer index ranging from 2 to the number of frames in the ith subsequence. It is noted that the intra-encoding mode is used to encode the first frame in each subsequence.

Figure 2:
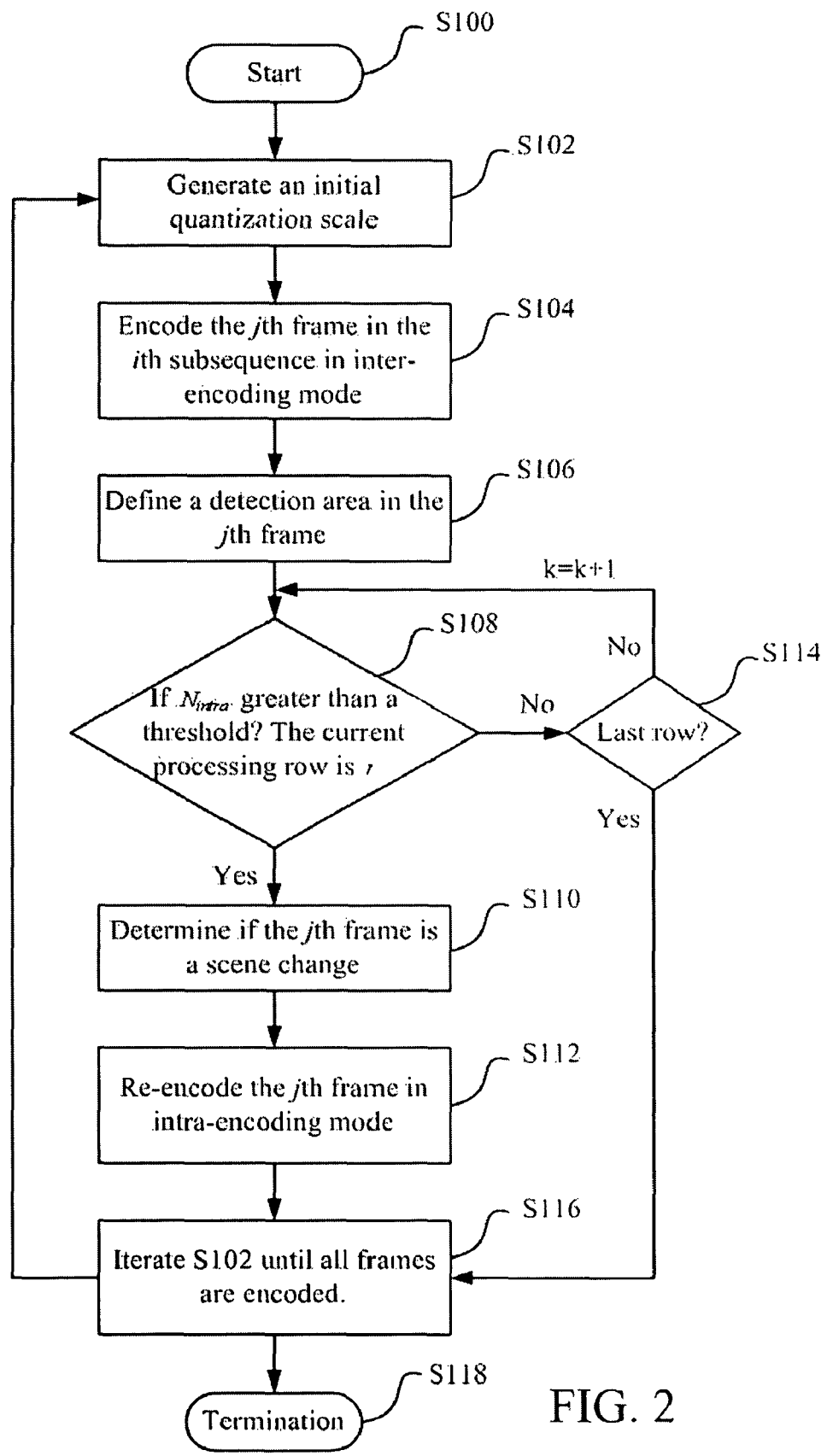
FIG. 2 is the flow chart of the video encoding method of the invention.

Referring to FIG. 2, the flow chart of the video encoding method of the invention is illustrated. The video encoding method includes the following steps:

Step S100: Start the encoding process.

Step S102: Generate an initial quantization scale based on the encoded frames.

Step S104: Encode the jth frame in the ith subsequence in an inter-encoding mode in accordance with the initial quantization scale.

Step S106: Define a detection area in the current jth frame.

Step S108: Determine whether the total number of intra macroblocks of all rows previous to and including a current processing row within the detection area, $N_{intra}$, is greater than a threshold, $N_{thres}$, when the last intra macroblock of the current processing row is being processed.

Step S110: If the result of S108 is YES, label the current jth frame as a scene change and continue to perform Step S112. Otherwise, go to Step 114.

Step S112: Generate an adjusted quantization scale based on the initial quantization scale and re-encode the jth frame in the ith subsequence in an intra-encoding mode in accordance with the adjusted quantization scale. Then go to Step 116.

Step S114: Continue performing S108 on the current jth frame until all rows within the detection area are examined, and then go to Step S116.

Step S116: Iterate S102 until all frames in the video sequence are encoded.

Step S118: Termination.

Contrast to prior arts, the invention re-encodes the current frame according to complexity information of the encoded frames when the current frame in a video sequence is labeled as a scene change. Specifically, this invention only re-encodes those frames where a scene change is detected. Therefore, this invention is a hybrid technique of multi-pass and single pass variable bit rate controller, which achieves better and consistent picture quality of the encoded video sequences. Besides, it can save a large amount of temporary encoding data.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video encoding method, a video sequence comprising N subsequences which each comprises a plurality of frames, said method functioning encoding the jth frame in the ith subsequence, frames previous to the jth frame in the ith subsequence having been encoded, N being a natural number, i being an integer index ranging from 1 to N, j being an integer index ranging from 2 to the number of the frames of the ith subsequence, said method comprising the steps of:
   (a) based on the encoded frames, generating an initial quantization scale, wherein the initial quantization scale is determined by a predicted quantization scale and a differential quantization scale, and, wherein the predicted quantization scale $Q_P$ is determined by the following equation:

$$Q_P = \frac{\text{MIN}(X_A, X_L)}{B} + 1,$$

where $X_A$ is a first video complexity defining the video complexity of all frames previous to the jth frame of the ith subsequence, and $X_L$ is a second video complexity defining the video complexity of the frames between the first and the (j−1)th frame in the ith subsequence, and B is a predetermined target bit rate;
   (b) encoding the jth frame in the ith subsequence in a first encoding mode in accordance with the initial quantization scale;
   (c) defining a detection area in the current jth frame, and determining whether the jth frame in the ith subsequence is a scene change relative to the (j−1)th frame in the ith subsequence within the detection area which is smaller than the frame; and
   (d) when YES in step (c), based on the initial quantization scale, generating an adjusted quantization scale, and re-encoding the jth frame in the ith subsequence in a second encoding mode in accordance with the adjusted quantization scale.

2. The method according to claim 1, wherein the first video complexity $X_A$ is determined by the following equation:

$$X_A = S_A * Q_A * \frac{F}{N_A^2},$$

where $S_A$ is a first summation of bit length defining the accumulated bit length of all frames previous to the jth frame of the ith subsequence, $Q_A$ is a first summation of quantization scale defined by accumulating the quantization scales of all frames previous to the jth frame of the ith subsequence, $N_A$ is a first number of frames defining the number of all frames previous to the jth frame of the ith subsequence, and F is a predetermined frame rate.

3. The method according to claim 2, wherein the second video complexity $X_L$ is determined by the following equation:

$$X_L = S_L * Q_L * \frac{F}{N_L^2},$$

where $S_L$ is a second summation of bit length defining the accumulated bit length of frames between the first and the (j−1)th frame in the ith subsequence, $Q_L$ is a second summation of quantization scale defined by accumulating the quantization scales of frames between the first and the (j−1)th frame in the ith subsequence, and $N_L$ is a second number of frames defining the number of frames between the first and the (j−1)th frame in the ith subsequence.

4. The method according to claim 3, wherein the differential quantization scale $Q_d$ is determined by the following equation:

$$Q_d = K * \left(\frac{S_{buf}}{\text{buf\_size}} - 0.5\right), S_{buf} = \text{MAX}\left(S_{buf} + S_j - \frac{B}{F}, 0\right),$$

where $S_{buf}$ is the current number of buffered bits, $S_j$ is the current number of generated bits from the jth frame, buf_size is a predetermined buffer size, and K is a first predetermined model parameter which determines the scale of differential quantization scale.

5. The method according to claim 4, wherein the initial quantization scale Q is determined by the following equation:

$$Q = \text{MAX}(Q_{MIN}, \text{MIN}(Q_{MAX}, Q_P + Q_d)),$$

where a predetermined maximum and the minimum value of quantization scale are defined by $Q_{MAX}$ and $Q_{MIN}$, respectively.

6. A video encoding method, a video sequence comprising N subsequences which each comprises a plurality of frames, said method functioning encoding the jth frame in the ith subsequence, frames previous to the jth frame in the ith subsequence having been encoded, N being a natural number, i being an integer index ranging from 1 to N, j being an integer index ranging from 2 to the number of the frames of the ith subsequence, said method comprising the steps of:
   (a) based on the encoded frames, generating an initial quantization scale;
   (b) encoding the jth frame in the ith subsequence in a first encoding mode in accordance with the initial quantization scale;
   (c) defining a detection area in the current jth frame, and determining whether the jth frame in the ith subsequence is a scene change relative to the (j−1)th frame in the ith subsequence within the detection area which is smaller than the frame; and
   (d) when YES in step (c), based on the initial quantization scale, generating an adjusted quantization scale, and re-encoding the jth frame in the ith subsequence in a second encoding mode in accordance with the adjusted quantization scale, wherein each of the plurality of frames has a predefined number of rows and columns, and each of the rows comprises a plurality of macroblocks, said step (c) further comprises:
   (c1) determining whether the total number of intra macroblocks of all rows previous to and including a current processing row within the detection area is greater than a threshold when the last intra macroblock of the current processing row is being processed, wherein the threshold is determined by the following equation:

$$\text{THR\_SC} = \frac{N_{mbv}}{DA} * N_{mbh} * \text{SC\_RATIO} + 1,$$

where $N_{mbv}$ is the number of macroblocks of the single column in the current jth frame, and $N_{mbh}$ is the number of macroblocks of the single row in the current jth frame, DA is a natural number defining the detection area, and SC_RATIO is a scene change ratio; and
   (c2) labeling the current jth frame as the scene change when the result of step (c1) is YES, or continuing performing step (c1) on the current jth frame until all rows in the detection area are examined when the result of step (c1) is NO.

7. A video encoding method, a video sequence comprising N subsequences which each comprises a plurality of frames, said method functioning encoding the jth frame in the ith subsequence, frames previous to the jth frame in the ith subsequence having been encoded, N being a natural number, i being an integer index ranging from 1 to N, j being an integer index ranging from 2 to the number of the frames of the ith subsequence, said method comprising the steps of:
   (a) based on the encoded frames, generating an initial quantization scale;
   (b) encoding the jth frame in the ith subsequence in a first encoding mode in accordance with the initial quantization scale;
   (c) defining a detection area in the current jth frame, and determining whether the jth frame in the ith subsequence is a scene change relative to the (j−1)th frame in the ith subsequence within the detection area which is smaller than the frame; and
   (d) when YES in step (c), based on the initial quantization scale, generating an adjusted quantization scale $\hat{Q}$, and re-encoding the ith frame in the ith subsequence in a second encoding mode in accordance with the adjusted quantization scale $\hat{Q}$, wherein each of the plurality of frames has a predefined number of rows and columns, and each of the rows comprises a plurality of macroblocks, said step (c) further comprises:
   (c1) determining whether the total number of intra macroblocks of all rows previous to and including a current processing row within the detection area is greater than a threshold when the last intra macroblock of the current processing row is being processed, wherein the threshold is determined by the following equation:

$$THR\_SC = \frac{N_{mbv}}{DA} * N_{mbh} * SC\_RATIO + 1,$$

where $N_{mbv}$, is the number of macroblocks of the single column in the current jth frame, and $N_{mbh}$ is the number of macroblocks of the single row in the current jth frame, DA is a natural number defining the detection area, and SC_RATIO is a scene change ratio; and
   (c2) labeling the current ith frame as the scene change when the result of step (c1) is YES, or continuing performing step (c1) on the current ith frame until all rows in the detection area are examined when the result of step (c1) is NO, and wherein the adjusted quantization scale $\hat{Q}$ is determined by the following equation:

$$\hat{Q} = Q * \left( \frac{S_{intra}}{L} * \frac{N_{mb}}{N_{intra}} * \frac{F}{B} \right),$$

where $N_{mb}$ is the number of total macroblocks in the current jth frame, $N_{intra}$ is the number of intra macroblocks in the current jth frame from the first pass of encoding, $S_{intra}$ is the bit length of intra macroblocks in the detection area of the current jth frame, and L is a second predetermined model parameter.

8. A video encoding system, a video sequence comprising N subsequences and each of the subsequences comprising a plurality of frames, said video encoding system being used to encode the jth frame in the ith subsequence and all previous frames having been encoded, N being a natural number, i being an integer index ranging from 1 to N, j being an integer index ranging from 2 to the number of the frames in the ith subsequence, said system comprising:
   a quantization scale generator for generating, based on the encoded frames, an initial quantization scale, wherein the initial quantization scale is determined by a predicted quantization scale $Q_P$ and a differential quantization scale and wherein the predicted quantization scale $Q_P$ is determined by the following equation:

$$Q_P = \frac{MIN(X_A, X_L)}{B} + 1,$$

where $X_A$ is a first video complexity defining the overall video complexity of all frames previous to the jth frame of the ith subsequence, $X_L$ is a second video complexity defining the video complexity of frames between the first and (j−1)th frame in the ith subsequence, and B is a predetermined target bit rate;
   an encoder, coupled to the quantization scale generator, for encoding the jth frame in the ith subsequence in a first encoding mode based on the initial quantization scale;
   a determination module for determining a detection area in the current jth frame; and
   a scene change detector, coupled to the encoder, for determining when the jth frame in the ith subsequence is a scene change relative to the (j−1)th frame in the ith subsequence within the detection area which is smaller than the frame;
   where the quantization scale generator generates an adjusted quantization scale based on the initial quantization scale and the encoder re-encodes the jth frame in the ith subsequence in a second encoding mode when the jth frame in the ith subsequence is a scene change.

9. The system according to claim 8, wherein the first video complexity $X_A$ is determined by the following equation:

$$X_A = S_A * Q_A * \frac{F}{N_A^2},$$

where $S_A$ is a first summation of bit length defining the accumulated bit length of all frames previous to the jth frame of the ith subsequence, $Q_A$ is a first summation of quantization scale defined by accumulating the quantization scales of all frames previous to the jth frame of the ith subsequence, $N_A$ is a first number of frames defining the number of all frames previous to the jth frame of the ith subsequence, and F is a predetermined frame rate.

10. The system according to claim 9, wherein the second video complexity $X_L$ is determined by the following equation:

$$X_L = S_L * Q_L * \frac{F}{N_L^2},$$

where $S_L$ is a second summation of bit length defining the accumulated bit length of frames between the first and (j−1)th frame in the ith subsequence, $Q_L$ is a second summation of quantization scale defined by accumulating the quantization scales of frames between the first and (j−1)th frame in the ith subsequence, and $N_L$ is a second number of frames defining the number of frames between the first and (j−1)th frame in the ith subsequence.

11. The system according to claim 10, wherein the differential quantization scale $Q_d$ is determined by the following equation:

$$Q_d = K * \left( \frac{S_{buf}}{buf\_size} - 0.5 \right), S_{buf} = \text{MAX}\left(S_{buf} + S_j - \frac{B}{F}, 0\right)$$

where $S_{buf}$ is the current number of buffered bits, $S_j$ is the current number of generated bits from the jth frame, buf_size is a predetermined buffer size, and K is a first predetermined model parameter which determines the scale of differential quantization scale.

12. The method according to claim 11, wherein the initial quantization scale Q is determined by the following equation:

$$Q = \text{MAX}(Q_{MIN}, \text{MIN}(Q_{MAX}, Q_P + Q_d)),$$

where a predetermined maximum value and a predetermined minimum value of quantization scale are defined by $Q_{MAX}$ and $Q_{MIN}$, respectively.

13. A video encoding system, a video sequence comprising N subsequences and each of the subsequences comprising a plurality of frames, said video encoding system being used to encode the ith frame in the ith subsequence and all previous frames having been encoded, N being a natural number, i being an integer index ranging from 1 to N, j being an integer index ranging from 2 to the number of the frames in the ith subsequence, said system comprising:

a quantization scale generator for generating, based on the encoded frames, an initial quantization scale;

an encoder, coupled to the quantization scale generator, for encoding the jth frame in the ith subsequence in a first encoding mode based on the initial quantization scale;

a determination module for determining a detection area in the current jth frame; and a scene change detector, coupled to the encoder, for determining when the jth frame in the ith subsequence is a scene change relative to the (j−1)th frame in the ith subsequence within the detection area which is smaller than the frame;

where the quantization scale generator generates an adjusted quantization scale based on the initial quantization scale and the encoder re-encodes the jth frame in the ith subsequence in a second encoding mode when the jth frame in the ith subsequence is a scene change, wherein each of the plurality of frames has a predefined number of rows and columns, and each of the rows comprises a plurality of macroblocks, said scene change detector further comprises:

a judgment module for determining whether the total number of intra macroblocks of all rows previous to and including a current processing row within the detection area is greater than a threshold when the last intra macroblock of the current processing row is being processed;

wherein the judgment module labels the current jth frame as the scene change when the total number of intra macroblocks of all rows previous to and including the current processing row within the detection area is greater than the threshold; otherwise, the judgment module continues performing the judgment process on the current jth frame until all rows in the detection area are examined, and wherein the threshold is determined by the following equation:

$$\text{THR\_SC} = \frac{N_{mbv}}{DA} * N_{mbh} * \text{SC\_RATIO} + 1,$$

where $N_{mbv}$ is the number of macroblocks of the single column in the current jth frame, and $N_{mbh}$ is the number of macroblocks of the single row in the current jth frame, DA is a natural number defining the detection area, and SC_RATIO is a scene change ratio.

14. A video encoding system, a video sequence comprising N subsequences and each of the subsequences comprising a plurality of frames, said video encoding system being used to encode the jth frame in the ith subsequence and all previous frames having been encoded, N being a natural number, i being an integer index ranging from 1 to N, j being an integer index ranging from 2 to the number of the frames in the ith subsequence, said system comprising:

a quantization scale generator for generating, based on the encoded frames, an initial quantization scale;

an encoder, coupled to the quantization scale generator, for encoding the jth frame in the ith subsequence in a first encoding mode based on the initial quantization scale;

a determination module for determining a detection area in the current jth frame; and a scene change detector, coupled to the encoder, for determining when the jth frame in the ith subsequence is a scene change relative to the (j−1)th frame in the ith subsequence within the detection area which is smaller than the frame;

where the quantization scale generator generates an adjusted quantization scale $\hat{Q}$ based on the initial quantization scale and the encoder re-encodes the jth frame in the ith subsequence in a second encoding mode when the jth frame in the ith subsequence is a scene change, wherein each of the plurality of frames has a predefined number of rows and columns, and each of the rows comprises a plurality of macroblocks, said scene change detector further comprises:

a judgment module for determining whether the total number of intra macroblocks of all rows previous to and including a current processing row within the detection area is greater than a threshold when the last intra macroblock of the current processing row is being processed;

wherein the judgment module labels the current jth frame as the scene change when the total number of intra macroblocks of all rows previous to and including the current processing row within the detection area is greater than the threshold; otherwise, the judgment module continues performing the judgment process on the current jth frame until all rows in the detection area are examined, and wherein the threshold is determined by the following equation:

$$\text{THR\_SC} = \frac{N_{mbv}}{DA} * N_{mbh} * \text{SC\_RATIO} + 1,$$

where $N_{mbv}$ is the number of macroblocks of the single column in the current jth frame, and $N_{mbh}$ is the number of macroblocks of the single row in the current jth frame, DA is a natural number defining the detection area, and SC_RATIO is a scene change ratio, wherein the adjusted quantization scale $\hat{Q}$ is determined by the following equation:

$$\hat{Q} = Q * \left( \frac{S_{intra}}{L} * \frac{N_{mb}}{N_{intra}} * \frac{F}{B} \right),$$

where $N_{mb}$ is the number of total macroblocks in the current jth frame, $N_{intra}$ is the number of intra macroblocks in the current jth frame from the first pass of encoding, $S_{intra}$ is the bit length of intra macroblocks in the detection area of the current jth frame, and L is a second predetermined model parameter.

* * * * *